United States Patent [19]

Shrimpton, Ronald J.

[11] Patent Number: 4,716,641
[45] Date of Patent: Jan. 5, 1988

[54] TRUCK WINDSHIELD MOULDING INSERTION TOOL

[76] Inventor: Shrimpton, Ronald J., 15 Walker Crescent, Saskatoon, Saskatchewan, Canada, S4L 4H7

[21] Appl. No.: 920,729

[22] Filed: Oct. 20, 1986

[30] Foreign Application Priority Data

Jun. 19, 1986 [CA] Canada .................................. 511969

[51] Int. Cl.⁴ ............................................ B23P 19/02
[52] U.S. Cl. ....................................................... 29/235
[58] Field of Search .................... 81/488; 29/235, 270, 29/238, 283.5

[56] References Cited

U.S. PATENT DOCUMENTS

| | | | |
|---|---|---|---|
| 2,189,138 | 2/1940 | Eichner | 29/235 |
| 2,486,666 | 11/1949 | Maudlin | 29/270 |
| 2,533,367 | 12/1950 | Gruszecki | 29/235 |
| 3,448,508 | 6/1969 | Passage et al. | 29/235 |
| 3,550,242 | 12/1970 | Sarvay et al. | 29/235 |
| 4,185,371 | 1/1980 | Barnett | 29/235 |

*Primary Examiner*—Roscoe V. Parker
*Attorney, Agent, or Firm*—Jacobson and Johnson

[57] ABSTRACT

Truck windshield sealing mouldings for GM or Ford products use a tool having a rectangular opening through which the insert moulding is fed to force same into the sealing moulding but this tool and configuration is not usable with truck products produced by Dodge and some foreign manufacturers. The present tool includes a flattened front end portion having a V-shaped aperture formed therein with the narrow apex of the V directed towards the pointed end of the tool. A preferred embodiment includes the aperture widening into a rectangular rear opening so that the tool can be used with the majority of truck windshields sealing mouldings including GM, Ford, and Dodge products as well as several foreign truck products.

2 Claims, 10 Drawing Figures

PRIOR ART  FIG. 1

TRUCK WINDSHIELD MOULDING INSERTION TOOL

BACKGROUND OF THE INVENTION

The moulding holding a truck windshield in position includes an elastomeric moulding engaged over the metal or plastic frame edge defining the windshield opening and having a peripheral slot into which the windshield engages. The outer edge of the moulding defining the windshield edge engaging slot is then forced against the outside face of the windshield for sealing purposes, by the insertion of an insert moulding into a slot adjacent said outer edge. When new, these insert mouldings are relatively easy to insert but when replacing windshields, after considerable use has occurred, the mouldings tend to harden and sometimes are extremely difficult to replace.

For trucks manufactured by General Motors and Ford Motors, a tool exists consisting of a flattened strip having a relatively blunt pointed one end with a rectangular aperture being formed through the flatened strip just behind this one end.

The insert moulding is fed through the aperture from the rear underside so that the moulding lies over the pointed edge which is then engaged within the flanged slot and the tool is then moved along the slot with the sides of the tool opening the slot and the rear of the aperture forcing the moulding down into the slot so that the flanged upper edges engage under the sides of the moulding.

Unfortunately, this configuration only operates with GM and Ford products and cannot be used with insert mouldings of trucks manufactured by Dodge or several foreign manufacturers.

It is therefore normal for such mouldings to be forced into place by opening the slot with a screw driver and using a rubber mallet or the like to pound the insert moulding into position.

The present invention overcomes these disadvantages by providing a tool, the principal object of which is to engage the insert moulding into the receiving slot of the sealing moulding, in a manner similar to the tool manufactured for GM or Ford products but using a configuration considerably different from the existing tool.

A preferred embodiment of the invention combines the shape apertures of both the existing GM tool and the present invention so that a single tool can be used for GM truck windshield mouldings, Ford truck windshields mouldings, Dodge windshield sealing mouldings and many foreign manufacturers' windshield mouldings.

An aspect of the invention is therefore to provide a device of the character herewithin described of a tool for engaging an insert moulding within the channel of a truck windshield sealing moulding comprising a flattened elongated metal strip, the sides of said strip at one end thereof converging substantially to a point, and a V-shaped aperture formed clear through said strip from one face to the other with the apex of the V-shaped aperture being adjacent said pointed one end, said aperture lying symmetrically along the longitudinal axis of said strip with the sides of the aperture being substantially spaced and parallel to the sides of the said one end of said strip, said sides of the aperture widening gradually from the apex thereof to the rear end of the aperture, said rear end of the aperture being perpendicular to the longitudinal axis of said strip.

Another advantage of the invention is to provide, in the preferred embodiment, a single tool usable for the majority of truck windshield insert mouldings.

A still further advantage of the invention is to provide a device of the character herewithin described which is simple in construction, economical to manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a fragmentary plan view of the operative end of the existing tool.

In the drawings like characters of reference indicate corresponding parts in the different figures.

DETAILED DESCRIPTION

Figure 7A:
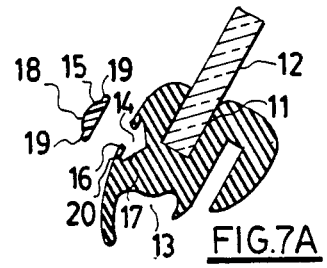
FIG. 7A is an exploded end view of the moulding of FIG. 7.
Figure 7:
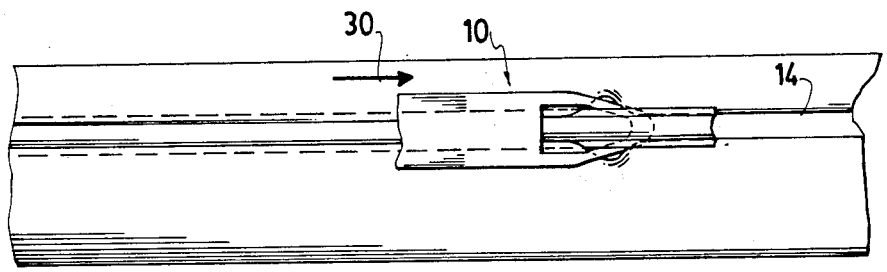
FIG. 7 is a view similar to FIG. 6 but showing a GM or Ford type moulding.

Proceeding therefore to describe the invention in detail, reference should first be made to FIGS. 7 and 7A which show the sealing moulding collectively designated 10 for GM or Ford truck products. It consists of an elastomeric moulding having a slot 11 to receive the edge of the windshield 12, slots 13 to receive the edge of the metal or plastic frame defining the windshield opening, and a slot 14 to receive the sealing moulding 15. This slot 14 includes the inwardly facing edge flanges 16 and a base 17. The moulding used on GM or Ford truck products includes the elongated arcuately curved crown portion 18 with side flanges 19 extending upon each side thereof in a substantially horizontal plane and these side flanges have to be engaged within the recessed sides 20 of the groove or channel 14.

Figure 1A:
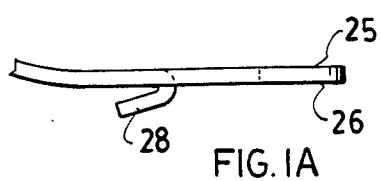
FIG. 1A is a side elevation of FIG. 1.
Figure 2:
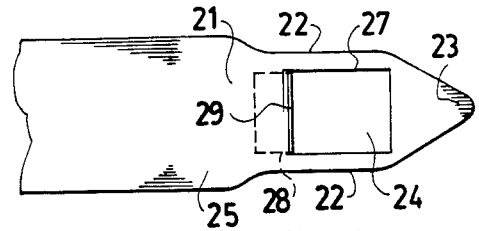
FIG. 2 is a plane view of one embodiment of the present invention.
Figure 2:
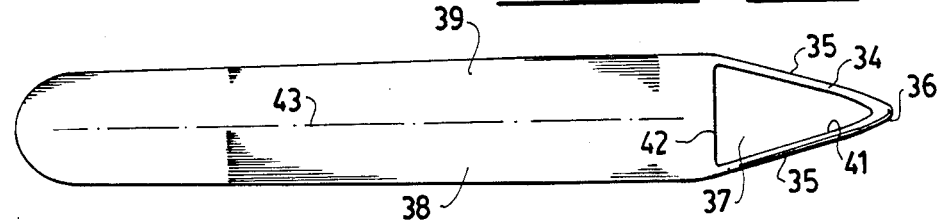

FIGS. 1 and 2 show the operating end 21 of a tool designed specifically for the insertion of this moulding 15 into the slot or groove 14. It consists of a flat strip of metal with the major portion of the sides 22 of the end being spaced and parallel from one another and terminating in a relatively blunt nose or end 23.

A rectangular aperture 24 is formed through this end from one face 25 to the other face 26 with the sides 27 of the apertures being spaced and parallel with one another and with the sides 22.

A downturned transferse flange 28 extends rearwardly and downwardly from the rear edge 29 of the aperture 24.

The operation of this particular device is illustrated in FIG. 7 with the blunt nose being forced into the slot or groove 14 and the tool extending upwardly and rearwardly from the slot thus forcing apart the flanges 16.

The insert strip 15 extends through the aperture 24 from the rear underside thereof and the tool is moved in the direction of arrow 30 with the flange 28 bearing down on the crown 18 of the insert moulding or strip and forcing same into the slot at the point where the sides of the tool force the flanges 16 apart. They immediately close over the flanges 19 of the insert strip thus retaining same. A lubricant is usually used during this process.

However, as hereinbefore described, this tool will not operate with the somewhat narrower insert strip 15A used in other truck windshield moulding installations such as Dodge products.

Figure 6A:
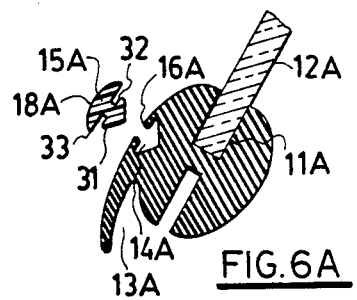
FIG. 6A is an exploded end elevation of the Dodge type moulding and insert.
Figure 6:
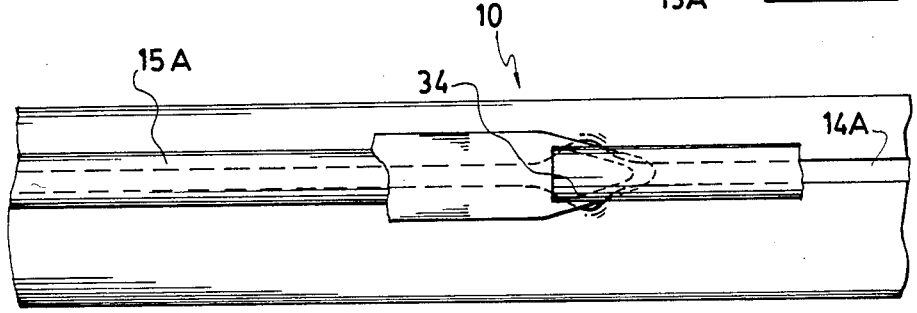
FIG. 6 is a fragmentary top plan view of a Dodge windshield moulding shoing the insert engaged by the tool.

FIGS. 6 and 6A show such mouldings which are similar in general configuration to those shown in FIGS. 7 and 7A so that similar reference characters have been used with the suffix A affixed thereto.

The insert moulding of FIGS. 6 and 6A shows a crowned upper portion 18A and downwardly extending base portion 31 with longitudinal grooves 32 being formed on each side of the junction of the base with the crown thus defining flanged sides 33 of the crown but with these sides 33 remaining on top of the portion of the moulding defining the slot or groove 14A. It is therefore necessary to move the inwardly extending flanges 16A apart sufficiently to enable the base 31 to be inserted whereupon these flanges 16A engage the grooves 32 of the insert moulding.

Figure 3:
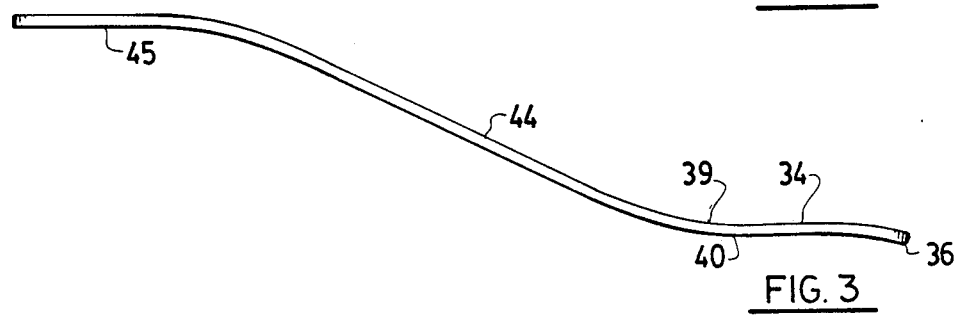
FIG. 3 is a side elevation thereof.

The tool shown in FIGS. 2 and 3 is designed specifically for this purpose and includes an operating end 34 with the sides 35 of this end converging to a point 36 and it will be seen that this pointed end is much sharper, when viewed in plan, than the bulldog nose end 23 of the prior art.

A V-shaped slot 37 is formed through the metal strip 38 forming the tool of FIGS. 2 and 3 and once again goes clear through the strip from the upper face 39 to the lower face 40.

The sides 41 defining the V-shaped slot 37 run substantially spaced and parallel with the sides 35 of the strip and the V-shaped aperture terminates in a transverse rear side 42 perpendicular to the longitudinal axis 43 of the tool.

This end portion 34 is downturned slightly at the tip 36 thereof and then the tool inclines upwardly and rearwardly from the front portion 35 to form the central portion 44.

It then terminates in a rear hand engaging portion 45 which is substantially parallel to the front portion 34 and situated in a plane parallel to but spaced upwardly and rearwardly from the plane of the front portion 36.

It will be noted that the rear flange 28 extending from the rear of the rectangular aperture 24 in the prior art, is not required in the present embodiment.

However, operation is similar with the elongated pointed end portion 34 moving the flanges 16A apart sufficiently to enable the base 31 to be forced downwardly into the slot or groove 14A.

Figure 4:
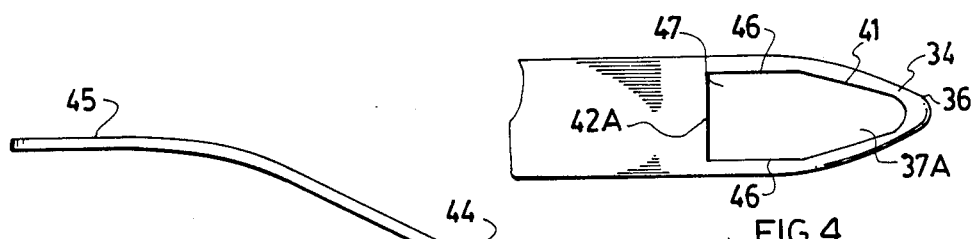
FIG. 4 is a fragmentary plane view of the operative end of the preferred embodiment of the invention.
Figure 5:
FIG. 5 is a side elevation of FIG. 4.

The preferred embodiment is shown in FIGS. 4 and 5 with the V-shaped slot 37A extending rearwardly and then continuing with straight and parallel sides 46 extending rearwardly to form a rectangular aperture portion 47 once again terminating in the transverse rear edge 42A.

This rear rectangular portion 47 permits the tool to be used not only with the type of strip illustrated in FIGS. 6 and 6A but also in engaging the strip shown in FIGS. 7 and 7A so that a universal tool is provided which can be used to insert the majority of insert strips regardless of the manufacture thereof.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A tool for engaging an insert moulding within the channel of a truck windshield sealing moulding comprising a flattened elongated metal strip, the sides of said strip at one end thereof converging substantially to a point, and a V-shaped aperture formed clear through said strip from one face to the other with the apex of the V-shaped aperture being adjacent said pointed one end, said aperture lying symmetrically along the longitudinal axis of said strip with the sides of the aperture being substantially spaced and parallel to the sides of the said one end of said strip, said sides of the aperture widening gradually from the apex thereof to the rear end of the aperture, said rear end of the aperture being perpendicular to the longitudinal axis of said strip, said aperture including rear side wall portions extending from the rear ends of said V-shaped aperture, said rear side wall portions being spaced and parallel to one another and terminating at said rear end of said aperture thereby defining, when in plan, a front, V-shaped aperture portion and a rear, substantially rectangular aperture portion as a continuation of said V-shaped aperture portion.

2. The tool according to claim 1 in which said strip, when viewed in side elevation, includes a front portion containing said aperture and a central portion extending upwardly and rearwardly from said front portion, and a rear portion lying substantially parallel to said front portion but in a plane above and rearwardly of the plane of said front portion.

* * * * *